United States Patent Office 3,449,136
Patented June 10, 1969

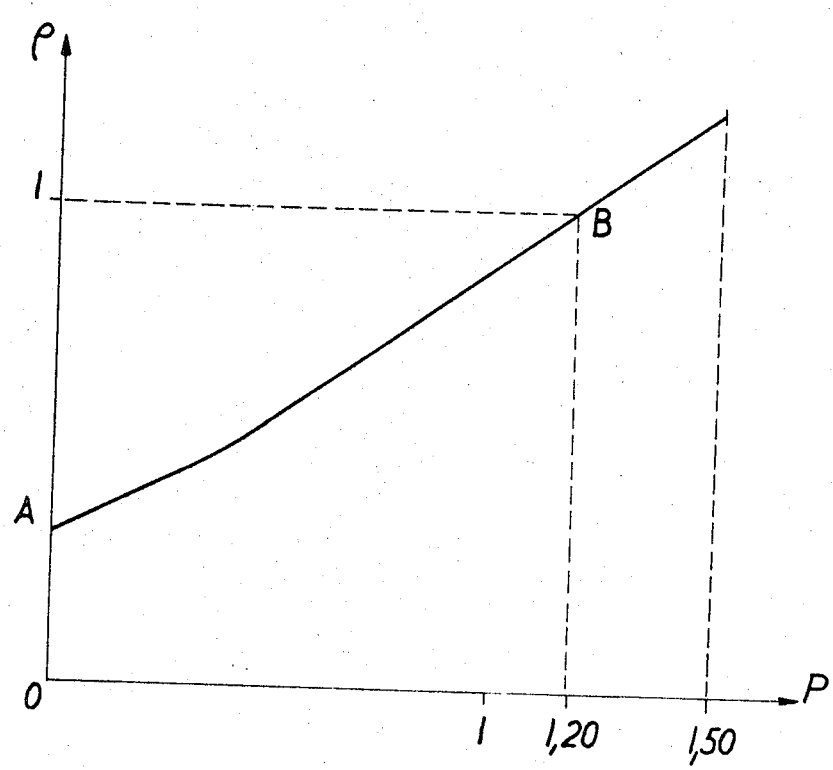

3,449,136
PHOSPHATE GLASS FOR X-RAY, GAMMA RAY AND THERMAL NEUTRON DOSIMETERS
Serge Carpentier, Creteil, and Roger Delarue and Henri Francois, Paris, Anne-Marie Grand-Clement, Meudon la Foret, Guy Portal, Massy, and Georges Soudain, Antony, France, assignors to Commissariat a l'Energie Atomique, Paris, France
Filed Feb. 28, 1966, Ser. No. 530,593
Claims priority, application France, Mar. 5, 1965, 8,203
Int. Cl. C03c 3/16
U.S. Cl. 106—47        6 Claims This invention relates to a new and novel glass for X-ray, gamma ray and thermal neutron dosimeters.

Glasses for X-ray and gamma ray dosimeters are already known in which the starting mixture corresponds to the following composition by weight:

| | |
|---|---|
| Aluminum metaphosphate | 50 |
| Magnesium metaphosphate | 25 |
| Lithium metaphosphate | 25 |
| Silver metaphosphate | 8 |

These glasses are hypersensitive to thermal neutrons, with the result that they cannot conveniently be employed for the purpose of measuring the flux of particles of this type.

Another glass is fabricated from a starting mixture which contains by weight 50 parts of lithium metaphosphate and 50 parts of aluminum metaphosphate, the final product being obtained by addition of three parts of boron oxide $B_2O_3$ and seven parts of silver metaphosphate $P_2O_7Ag_2$. This glass also has the above-mentioned hypersensitivity to thermal neutrons as well as high hygroscopicity due to the present of boron oxide $B_2O_3$, which results in alteration of the glass and consequently makes it extremely difficult to employ.

The glasses which form the subject of this invention are not subject to the disadvantages noted above.

The present applicant has developed a novel glass consisting of the oxides of lithium, beryllium, sodium, aluminum and silver as well as phosphorus pentoxide and has found that, by respectively modifying the proportions of lithium oxide $Li_2O$ and beryllium oxide BeO, it is possible to vary the sensitivity $S_n$ of these glasses to thermal neutrons; this sensitivity falls off when the content of lithium oxide decreases and becomes of minimum value when said content is reduced to zero.

The study of sensitivity to thermal neutrons $S_n$ and of sensitivity to gamma rays $\gamma S$ (sensitivities measured by the radiophotoluminescence intensities induced by identical radiation doses expressed in rem) shows that, in the case of a predetermined content of silver oxide $Ag_2O$, the ratio $\rho$ of these values ($\rho = S_n/S_\gamma$) varies in the same direction as the content by weight $T_{Li_2O}$ of lithium oxide.

The curve of the single accompanying figure represents the variations in the ratio $\rho$ ($\rho$ is measured in this case by the ratio of the fluorescence per rem due to thermal neutrons to the fluorescence per rem due to gamma rays) as a function of the percentage content by weight of lithium oxide of a glass in accordance with the invention.

The curve has been established on the basis of the equivalence laid down by the "National Bureau of Standards" (handbook 63, U.S. Department of Commerce, NBS November, 1957: 1 rem $NTh = 10^9$ neutrons/cm.²). This curve relates to glasses in which the contents of lithium and beryllium have been adjusted in such a manner that the sum of contents of lithium metaphosphate and of beryllium metaphosphate is constant.

Point A corresponds to a glass which does not contain lithium, the composition of which is as follows:

| | Percent |
|---|---|
| $Ag_2O$ | 2.63 |
| BeO | 6.08 |
| $Na_2O$ | 6.33 |
| $Al_2O_3$ | 6.66 |
| $P_2O_5$ | 78.30 |

It will be noted that this glass has minimum sensitivity to thermal neutrons.

Point B relates to a glass having the following composition:

| | Percent |
|---|---|
| $Li_2O$ | 1.20 |
| $Ag_2O$ | 2.63 |
| BeO | 5.12 |
| $Na_2O$ | 6.33 |
| $Al_2O_3$ | 6.66 |
| $P_2O_5$ | 78.06 |

It is found that, in the case of glass having composition B, the ratio $\rho$ of sensitivities is equal to 1; in this case, the photoluminescence intensities collected at the moment of reading are identical for a dose of 1 rem delivered either by $\gamma$-rays or by thermal neutrons.

It can thus be seen from the foregoing that the choice of percentage contents of lithium oxide $Li_2O$ and of beryllium oxide BeO makes it possible to determine the ratio $\rho$.

Broadly speaking, the composition by weight of oxide of base metals and of phosphorus pentoxide satisfies the conditions summarized by the following table:

| | Percent |
|---|---|
| $Li_2O$ | 0–1.5 |
| BeO | 5–15 |
| $Na_2O$ | 0.1–10 |
| $Al_2O_3$ | 0.1–10 |
| $Ag_2O$ | 1.5–10 |
| $P_2O_5$ | 71.8–80.5 |

What we claim is:
1. Glass for X-ray, $\gamma$-ray and thermal neutron dosimeters having a base of oxygenated compounds of phosphours including silver as activator, consisting essentially of the percentage composition by weight of metal oxide and of phosphorus pentoxide is comprised between the following limits:

| | Percent |
|---|---|
| $Li_2O$ | 0–1.5 |
| BeO | 5–15 |
| $Na_2O$ | 0.1–10 |
| $Al_2O_3$ | 0.1–10 |
| $Ag_2O$ | 1.5–10 |
| $P_2O_5$ | 71.8–80.6 |

2. Glass in accordance with claim 1 having a minimum sensitivity to thermal neutrons and having the following composition:

| | Percent |
|---|---|
| $Ag_2O$ | 2.63 |
| BeO | 6.08 |
| $Na_2O$ | 6.33 |
| $Al_2O_3$ | 6.66 |
| $P_2O_5$ | 78.30 |

3. Glass in accordance with claim 1, in which the sensitivity to thermal neutrons is identical with the sensitivity to gamma rays, and having the following composition:

| | Percent |
|---|---|
| $Li_2O$ | 1.20 |
| $Ag_2O$ | 2.63 |
| BeO | 5.12 |
| $Na_2O$ | 6.33 |
| $Al_2O_3$ | 6.66 |
| $P_2O_5$ | 78.06 |

4. A dosimeter comprising the glass of claim 1.
5. A dosimeter comprising the glass of claim 2.
6. A dosimeter comprising the glass of claim 3.

References Cited

UNITED STATES PATENTS

| 2,999,819 | 8/1961 | Blair | 106—47 XR |
| 3,294,700 | 12/1966 | Bedier et al. | 106—47 XR |

FOREIGN PATENTS 974,157  11/1964  Great Britain.

HELEN M. McCARTHY, *Primary Examiner.*

U.S. Cl. X.R.

250—83; 252—301.4, 408